US007103566B2

(12) United States Patent
Silva et al.

(10) Patent No.: US 7,103,566 B2
(45) Date of Patent: Sep. 5, 2006

(54) APPLICATIONS OF EXECUTABLE SHOPPING LISTS

(75) Inventors: Juliana Freire Silva, Murray Hill, NJ (US); Bharat Kumar, Belle Mead, NJ (US); Daniel Francis Lieuwen, Somerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1019 days.

(21) Appl. No.: 09/774,932

(22) Filed: Jan. 31, 2001

(65) Prior Publication Data

US 2001/0034658 A1 Oct. 25, 2001

Related U.S. Application Data

(60) Provisional application No. 60/184,288, filed on Feb. 23, 2000.

(51) Int. Cl.
G06Q 30/00 (2006.01)
(52) U.S. Cl. ........................................ 705/26
(58) Field of Classification Search ................. 705/26, 705/27
See application file for complete search history.

(56) References Cited

U.S. PATENT DOCUMENTS

| 5,960,411 | A | * | 9/1999 | Hartman et al. ............. 705/26 |
| 6,029,141 | A | * | 2/2000 | Bezos et al. ................. 705/27 |
| 6,477,509 | B1 | * | 11/2002 | Hammons et al. ........... 705/27 |
| 6,615,226 | B1 | * | 9/2003 | Hartman et al. ............ 715/505 |
| 6,629,079 | B1 | * | 9/2003 | Spiegel et al. ............... 705/26 |
| 6,694,316 | B1 | * | 2/2004 | Langseth et al. ............. 707/10 |

(Continued)

FOREIGN PATENT DOCUMENTS

EP 0784279 A1 * 7/1997

OTHER PUBLICATIONS

Stacklin, Jeff. "Business owners can mingle at startup's networking site" Crain's Cleveland Business. Cleveland: Feb. 21, 2000. vol. 21, Iss. 8 (2 pages).*

(Continued)

*Primary Examiner*—Mark Fadok
*Assistant Examiner*—Naeem Haq
(74) *Attorney, Agent, or Firm*—Stephen M. Gurey

(57) ABSTRACT

An executable shopping list (ESL) enables a user browsing an affiliate Web site's Web page to order, with a single action, a bundle of multiple items offered for sale by the affiliate's associated merchant Web site, wherein the bundle is one that is not offered or available for sale as a bundle to on-line visitors who directly access the merchant's Web site server. By selecting a link on the affiliate's Web page, the ESL is executed, thereby automatically loading the bundle of multiple items on that list into a virtual shopping cart at the merchant's Web site on behalf of the user. The virtual shopping cart, filled with the multiple items, is then returned to the user's browser for completion of the checkout procedure by the user. ESLs can be implemented on the affiliate site's side using what is referred to as smart bookmark technology, which records for later playback, the multiple steps required to load each item on the list into a shopping cart at the merchant's Web server. Alternatively, ESLs cam be implemented on the merchant's site side using the merchant's Web server's infrastructure. A discount can be optionally associated with the offer to purchase the multiple items in the bundle. ESLs are also applied to permission marketing where a merchant can bundle a group of items together and electronically offer that bundle to one or more customers who have agreed to receive such merchandising offers.

15 Claims, 3 Drawing Sheets

U.S. PATENT DOCUMENTS

| | | | |
|---|---|---|---|
| 6,907,315 B1 * | 6/2005 | Hartman et al. | 700/216 |
| 2001/0014868 A1 * | 8/2001 | Herz et al. | 705/14 |
| 2001/0027423 A1 * | 10/2001 | Clonts et al. | 705/26 |
| 2001/0056377 A1 * | 12/2001 | Kondoh et al. | 705/26 |
| 2002/0107733 A1 * | 8/2002 | Liu et al. | 705/14 |
| 2002/0194087 A1 * | 12/2002 | Spiegel et al. | 705/26 |
| 2003/0004831 A1 * | 1/2003 | Owens | 705/26 |
| 2003/0018536 A1 * | 1/2003 | Eggebraaten et al. | 705/26 |
| 2003/0018558 A1 * | 1/2003 | Heffner et al. | 705/37 |
| 2003/0033205 A1 * | 2/2003 | Nowers et al. | 705/26 |
| 2003/0093335 A1 * | 5/2003 | Silverbrook et al. | 705/26 |
| 2003/0177066 A1 * | 9/2003 | Zhang et al. | 705/14 |
| 2004/0139001 A1 * | 7/2004 | Henriques et al. | 705/39 |

OTHER PUBLICATIONS

Rosen, Cheryl "Here's My Order-And Don't Forget The Milk—Bar-Code Scanning Technology Eases Grocery Shopping, Speeds Comedy-Club Reservations.", InformationWeek, Nov. 13, 2000. Retrieved from Dialog File: 275, Acc#: 02449434.*

U.S. Appl. No. 09/387,571, filed Aug. 31, 1999.

Freire J. et al. "Automating Web Navigation with the WebVCR", Proc. Of WWW, pp. 503-517, 2000.

http://www.netgrocer.com/Homecfm?.

* cited by examiner

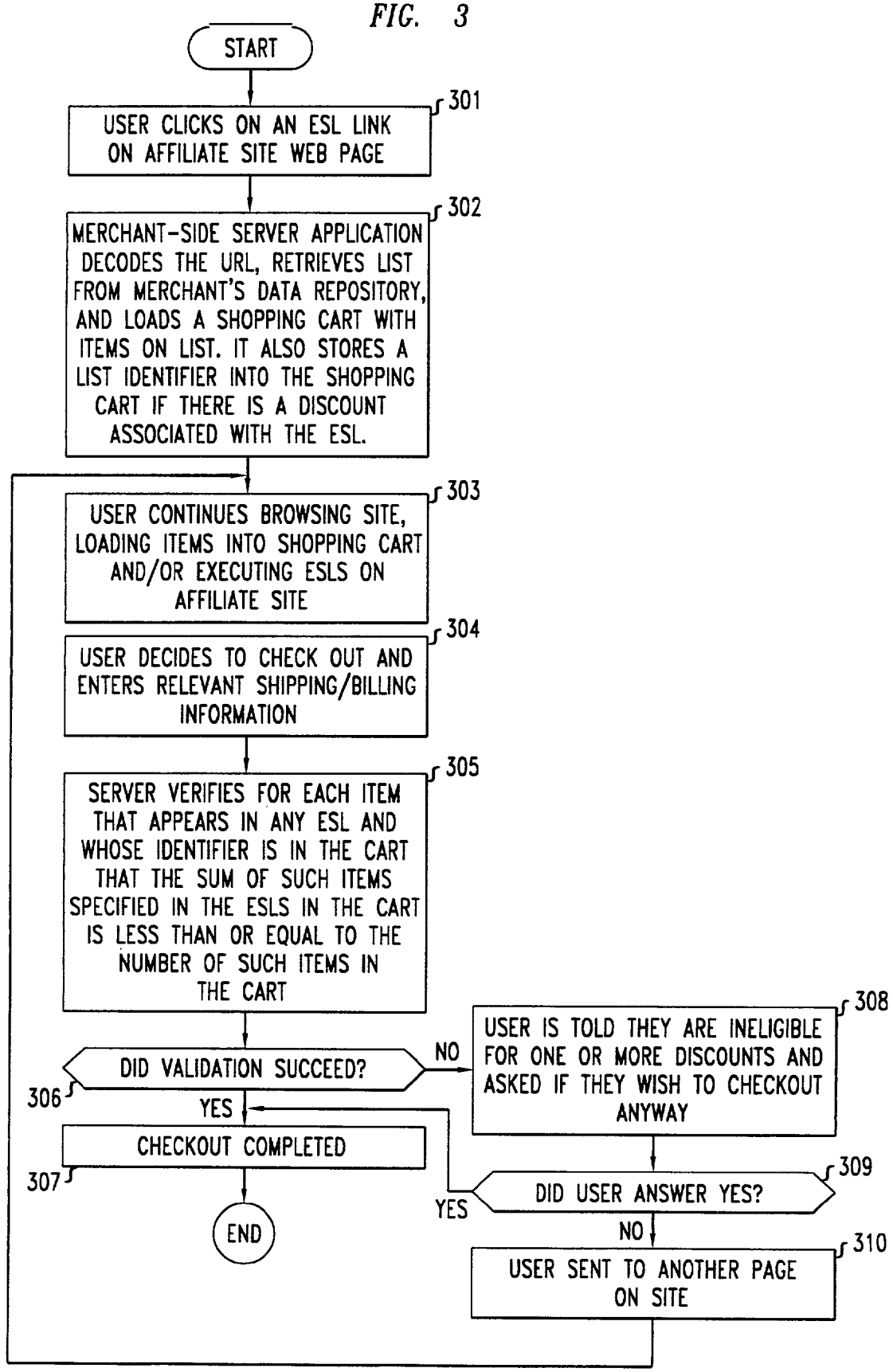

APPLICATIONS OF EXECUTABLE SHOPPING LISTS

CROSS-REFERENCE

This application claims the benefit of U.S. Provisional Application No. 60/184,288, filed Feb. 23, 2000.

TECHNICAL FIELD

This invention relates to on-line transactions involving the purchase of multiple items by a user at a terminal.

BACKGROUND OF THE INVENTION

Relationships between a referring Web site that provides a link to a merchant Web site that sells on-line an item advertised on the referring site are well known. The referring Web site is known in the art as an affiliate Web site of the merchant Web site. Generally, an affiliate site and its associated merchant site have a contractual arrangement in which the proprietors of the merchant site agree to pay the proprietors of the affiliate site a percentage of the purchases made by user who "arrives" at the merchant site via the link on the affiliate's Web page. Alternatively, a flat rate payment scheme may be used for compensating the affiliate or some combination or variant of these schemes. Various well known in the art mechanisms enable the merchant site to determine when a user arrives at that merchant site from an affiliate site. One such mechanism involves examining the packet header of the packets of the request arriving at the merchant site when the user clicks on the link on the Web page of the affiliate site. This header includes a reference to the address of the referring affiliate site from which the request originates. The merchant site can then track all subsequent steps taken by the user by using cookies or special encoding of the URLs as the user browses and adds items to his virtual shopping cart and makes a purchase. Another well known mechanism that enables the merchant site to determine that the user has arrived at its Web site via an affiliate site is through the use of encoded URLs that include both the item selected by the user on the affiliate site as well as an identifier of the affiliate site. No matter the method of associating a user/customer's transaction with the affiliate site that directed the user/customer to the merchant site, after the purchase has been completed and the user's credit card has been debited for the amount of the purchase, the merchant site will at some point credit the affiliate site with a percentage of the sale, or some other monetary compensation. Affiliate merchandising is financially beneficial to the proprietors of both the merchant and the affiliate sites. The merchant site is provided with a source of potential customers who are already browsing at a site whose content is directly related to that which the merchant site has to offer for sale, and the affiliate site is provided with a source of income that it would not otherwise have.

A user browsing the Web may be directed to a merchant site for the purpose of making a purchase of some item or service through various mechanisms. For example, a user browsing through the Barbra Streisand fan Web site at the URL www.barbrastreisand.com Web site may on one its pages view a selection of her CDs. By clicking on a link that says "Purchase Now" below a particular CD on such a Web page, the user's browser opens a new window and retrieves a Web page from the associated merchant site CDNow at the URL www.cdnow.com, which offers to the user that particular CD for purchase. By then clicking in that window on the "add to cart" link, that CD is added to the user's virtual shopping cart, the user being able to then or later complete the purchase of that CD. While at that merchant site, the user can purchase other CDs, or return to the URL www.barbrastreisand.com and click on another Barbra Streisand CD that he wishes to purchase. Thus, if the user wants to purchase multiple CDs, he needs repeatedly return to the affiliate site at www.barbrastreisand.com, click on the desired CD's "Purchase Now" link, and individually add that newly selected CD to his shopping cart. Alternatively, while at the CDNow Web site, the user needs to search for whatever other CD he wants to purchase and add that other CD to his shopping cart. When the user has completed filling his cart with the CDs he wishes to purchase, he enters a check-out phase of his transaction by providing his shipping address and credit card information to the merchant site if he is not previously known to that site through, for example, a cookie stored on his computer. Disadvantageously, such a procedure of individually selecting CDs from the affiliate's site and then adding them to his cart on the merchant's site is time-consuming and may cause users to order fewer CDs to the disadvantage of both the affiliate site and merchant site. Further, the affiliate is precluded from offering a user the purchase of a package of multiple CDs that might be of interest to a purchaser, such as, for example, Barbra Streisand's individual The Broadway Album and the Return to Broadway CDs unless the merchant site also offers them as a package on its Web page.

Although certain sites (e.g., http://www.netgrocer.com) enable a user to create and store lists of multiple items and to add the entire list to a shopping cart, such lists can only be accessed by the creator of the list. Further, such lists that may be available at a merchant site are accessible only by the user directly through the merchant site. As such, they are not useful for affiliate marketing where an offer of multiple items may be configured by the affiliate without any merchant site cooperation, and the offer is made available for acceptance to any visitor to the affiliate site.

SUMMARY OF THE INVENTION

In accordance with the present invention, a referring site creates and stores an executable shopping list (ESL) containing multiple items to be purchased that when selected by a user at the remote referring site, via that single action those multiple items in the ESL are automatically loaded into an electronic virtual shopping cart at the associated merchant's Web site. Thus, through that single action an order is automatically created at the merchant's Web site on behalf of the user. That order comprises a bundle of those multiple items, such bundle not being offered or available for sale to on-line visitors who directly (direct on-line visitors) access the merchant's Web site as opposed to through the remote site.

In a first embodiment, an ESL is created using what is referred to as smart bookmark technology. Smart bookmarks, and how they are created and replayed, are the subject of a co-pending patent application Ser. No. 09/387571 entitled "Method for Providing Fast Access to Dynamic Content on the World Wide Web", filed Aug. 31, 1999, and in a paper entitled "Automating Web Navigation with the WebVCR", by J. Freire, B. Kumar and D, Lieuwen, *Proc. of WWW*, pages, 503–517, 2000, which are incorporated herein by reference. As applied herein, smart bookmark technology is used to record the steps that must be performed at the merchant site to individually select each item in the ESL and place it in a user's/customer's shopping cart. Thus, when the ESL containing multiple items that the affiliate site has bundled together is selected by the user at the affiliate site, the smart bookmark is executed and each of those multiple items is sequentially loaded into the user's shopping cart at the merchant site as if the user were individually loading the items himself into his cart. Advantageously, the use of smart bookmark technology with ESLs at the affiliate site requires no merchant site infrastructure.

In a second embodiment of the present invention, the merchant site provides the infrastructure that allows for the storage and execution of a shopping list containing multiple items. When selected by the user at the affiliate site, the affiliate site links to an ESL stored at the associated merchant site, which then bundles the multiple items together and automatically loads the user's/customer's shopping cart with those multiple individual items. Advantageously, the shopping cart is filled quicker in this embodiment since a smart bookmark player neither need be started nor downloaded to the user's machine in order to execute the ESL, and the merchant site processes the merchant-side ESL more quickly. Furthermore, the affiliate can optionally offer a discount for the purchase of multiple items that might otherwise be compromised by a user if offered through smart bookmark affiliate-implemented ESLs.

The present invention can also be applied to permission marketing where a merchant may bundle a group of items together that are customized with a particular customer or type of customer in mind, and electronically offered directly to that customer or group of customers who have agreed to receive such merchandising offers. Thus, a bundle containing multiple individual items that are not offered or available for purchase as a bundle to on-line visitors who directly visit the merchant's Web site can be produced by a merchant site's marketing department that employs permission marketing. These bundles can then be electronically provided as an ESL to a potential customer in various ways such as in an email containing a link to the merchant's Web site or placed as a link on a personal Web page for individual customers. If accepted by the receiving customer using a client, the ESL in the offer is executed and the merchant site loads a virtual shopping cart on behalf of the users/customers with the multiple items on the list and sends the page containing the loaded shopping cart back to the customer's browser.

BRIEF DESCRIPTION OF THE DRAWING

FIG. 3 is a flow chart showing a merchant-side implementation of the affiliate program use of ESLs in accordance with the present invention.

DETAILED DESCRIPTION

As previously noted, affiliate programs are beneficial to both the referring affiliate site and its associated merchant site, providing what may be new customers to the latter, and a revenue stream to the former that it would not otherwise have. The smarter affiliate programs that the present invention enables, are even more valuable both to the merchant who ultimately ships the items ordered on-line to the consumer who uses the ordering service. In particular, the merchant site might receive a larger order than he would otherwise get from the on-line customer and the customer has the ease of ordering multiple items with a single action with an even added benefit of an optional discount upon ordering a bundled package of multiple items.

As a further example of a smart affiliate program, a Web site that provides recipes may include on one of its Web pages containing a particular recipe a link to a merchant site that sells the ingredients required by that recipe. When that link is to an executable shopping list at the merchant site, in accordance with the invention, then all the items needed for recipe are automatically loaded into that user's/customer's shopping cart at the merchant site. Absent the present invention, the user would need to individually load each of items into his shopping cart. Further, absent the present invention, the merchant site would need to have produced a bundle containing those specific items and displayed that bundle on its Web page for the user/customer to "click" on and load, as a bundle, into his shopping cart.

Figure 1:
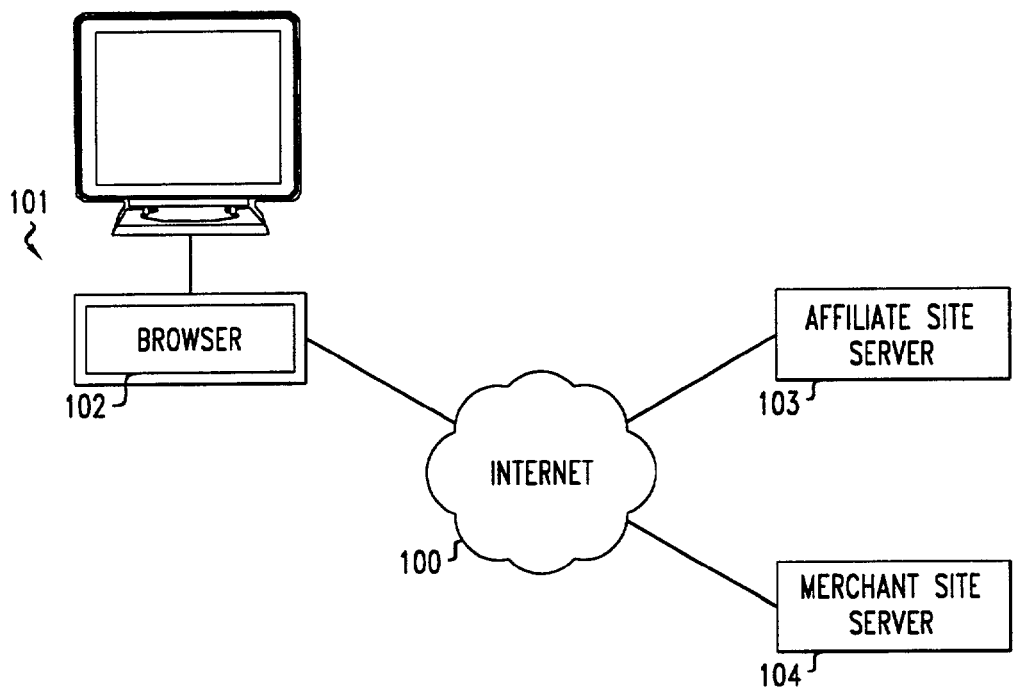
FIG. 1 is a block diagram showing the affiliate program use of executable shopping lists (ESLs) in accordance with the present invention.

FIG. 1 is a block diagram showing the affiliate program use of executable shopping lists in accordance with the present invention. A user/customer browsing the Internet 100 with his client 101 running browser 102 enters the URL of an affiliate site's server 103 or arrives at the affiliate site's server through a bookmark or link from another site. The affiliate server 103 sends a page containing one or more ESLs to the user's/customer's browser 102. The multiple items associated with each ESL that are offered for purchase through the affiliate site as a bundle are neither offered nor available for purchase by an on-line user who directly visits (a direct on-line visitor) the merchant's Web site with his browser. Further, since the bundle can be created directly by the affiliate or under its direction, the individual items that comprise the bundle are selected to create a package that would attract sales by visitors of the affiliate site to the benefit of both the affiliate and merchant sites.

Upon viewing a Web page containing one or more ESLs, the user/customer can select an ESL, which is sent to a merchant site's server 104. The merchant site's server 104 then individually loads a virtual shopping cart on behalf of the user/customer with the specific multiple items included in the ESL and sends a Web page containing the loaded cart back to the browser 102 for review by the user/customer. Before checking out, the user/customer may add any other desired items, or may remove any unneeded items from his cart. Furthermore, one or more coupons or multiple-item discounts optionally may be associated with the ESL displayed on the affiliate site server's Web page. When the user clicks on the link on the affiliate site's Web page, the coupon may also be automatically entered into the shopping cart for use with the purchase.

The present invention can be implemented using the smart bookmark technology which is described in the above-noted publication and co-pending patent application, which have been incorporated by reference herein. As described in therein, smart bookmark technology enables a sequence of browsing steps to be recorded, stored, and then later replayed by either the creator or anyone else who has a smart bookmark player stored on his browser or who downloads such a player. As applied to the present invention, the affiliate site in creating an ESL link to the merchant site Web server creates a smart bookmark that records the steps required to access the merchant site and individually loads each of the multiple items associated with that ESL into a virtual shopping cart and then present the loaded shopping cart to the user/customer. Thus, for the recipe example, each of the items called for by the recipe are loaded, on behalf of the user/customer, into a cart by the smart bookmark and the loaded cart is presented to the user/customer as if the user's/customer's browser had entered the merchant site's URL and had individually placed these same items into his cart himself via the multiple steps required to do so. Thus, when a user/customer viewing the affiliate site's Web page clicks on the link, a smart bookmark player is loaded from a site indicated by the link into that user's/customer's browser and a smart bookmark applet is started which plays the smart bookmark. The recorded steps within the smart bookmark are then sequentially played, thereby automatically accessing the affiliate's associated merchant site Web server and individually loading the user's/customer's shopping cart with the items specified by the recipe and included in the smart bookmark-implemented ESL. Advantageously, this implementation requires no participation on the merchant's behalf other than being a party to any coupon arrangement that the affiliate might optionally include as part of the shopping cart.

Figure 2:
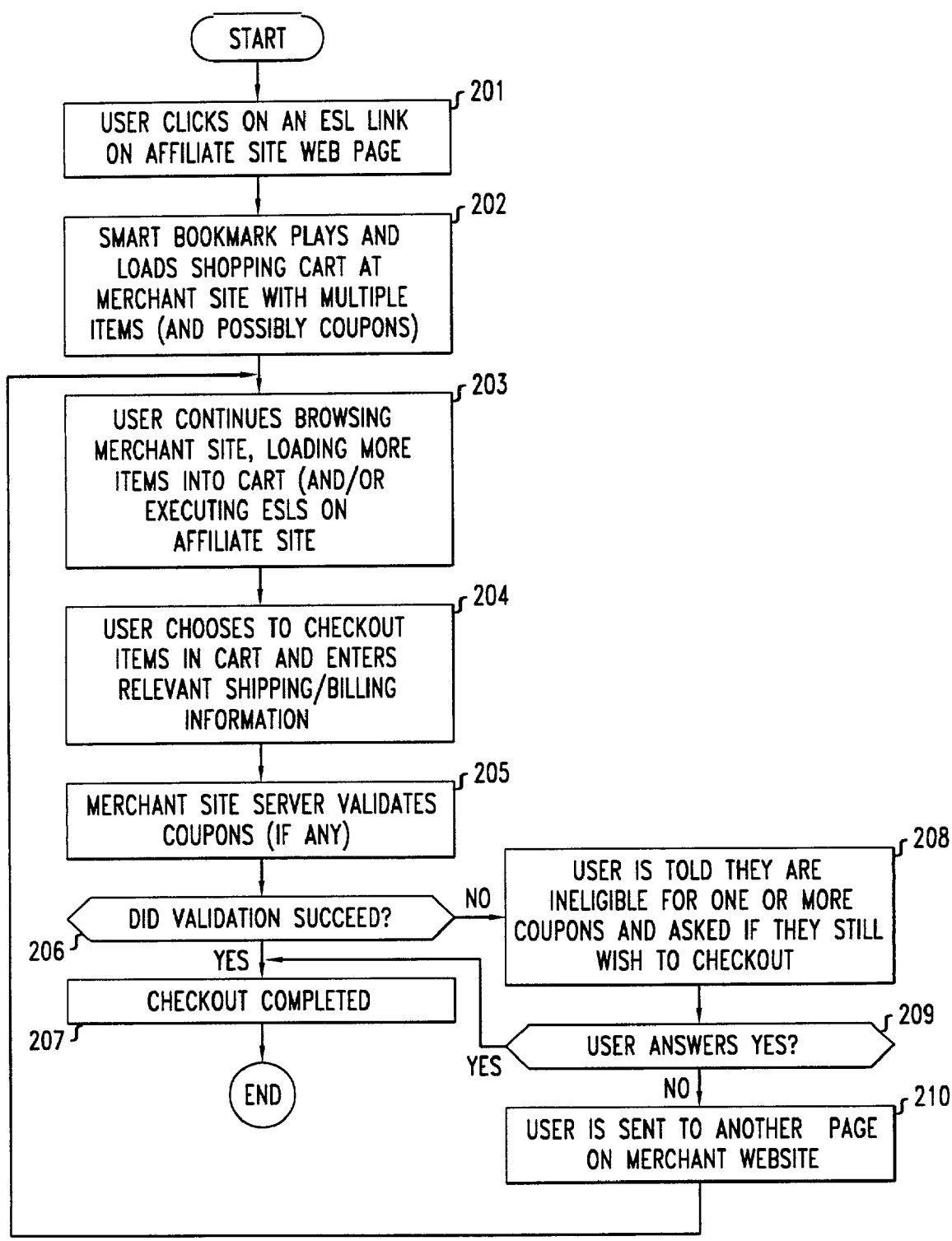
FIG. 2 is a flow chart showing a smart bookmark implementation of the affiliate program use of ESLs in accordance with the present invention.

With reference to FIG. 2, the steps associated with the smart bookmark implementation of the present invention are shown. At step 201, the user/customer clicks on an ESL link on the Web page of an affiliate site thereby indicating his intent to purchase the multiple items indicated on that page and associated with that link. At step 202, a smart bookmark plays and loads a shopping cart at the merchant's site with the individual multiple items and optionally enters coupons into the shopping cart, if allowed by the merchant site. At step 203, the user/customer continues browsing the merchant site, loading items into his cart, and/or executing other ESLs on the affiliate site. At step 204, the user/customer chooses to checkout whatever items are in his shopping cart, and enters his relevant shipping and/or billing information. At step 205, the merchant site server validates the coupons, if any. If, at step 206, the validation is determined by the merchant site to succeed, then the checkout is completed and, at step 207, the process ends. If, at step 206, the validation is determined by the merchant site to fail, then, at step 208, the user/customer is told that one or more of the coupons are ineligible for use and is asked if they still wish to checkout. If, at step 209, the user/customer answers yes, then checkout is completed and, at step 207, the process ends. If, at step 209, the user/customer answers no, then, at step 210, the user/customer is sent to another page on the merchant site, allowing the user to continue browsing at the merchant site at step 203.

The above-described embodiment of the present invention has the above-noted advantage that any affiliate can create ESLs without needing cooperation from the associated merchant site. However, obtaining merchant cooperation can be advantageous to the merchant, the affiliate, and the users/customers who opt to select an ESL link on the affiliate site Web page to link to the merchant Web site. Specifically, an implementation in which ESLs are stored at the merchant site is operationally faster since a merchant-side ESL requires fewer CPU cycles to execute than an affiliate-side smart bookmark-implemented ESL, thereby enabling the shopping cart to fill more quickly. Also, the user's/customer's shopping cart is filled more quickly because there in no need to either down-load (or start a local copy) of a smart bookmark player that delays the running of the smart bookmark. An additional advantage with a merchant-side implementation is that the affiliate can offer, with the cooperation of the merchant, discounted bundles in which there is no possibility of the customer cheating by removing items from the loaded shopping cart that make up the discounted bundle.

A merchant-side ESL can be implemented through either the addition at the merchant site of a new CGI-bin script (or the extension of a new one) that accepts URLs that encode ESLs. (Note that CGI-bin scripts is just one mechanism that Web sites can use. The above can also be implemented through servlets, or via some server-side scripting framework). To demonstrate this we return to the earlier described example in which the Barbra Streisand Web site at the URL www.barbrastreisand.com Web site is an affiliate of the merchant Web Site CDNow at the URL www.cdnow.com merchant. On that affiliate site, the link to a particular CD, The Broadway Album, is the following:

http://www.cdnow.com/switch/from=cr-8223101/
target=buyweb_purchase/item=317665.

The link to the CD, Return to Broadway is the following:
http://www.cdnow.com/switch/from=cr-8223101/
target=buyweb$_{13}$purchase/item=33322.

Each of these links takes you a page at the CDNow Web site that contains a description of the selected CD. Each URL is coded to indicate that it is being selected by a user/customer at the www.barbrastreisand.com Web site (indicated by "from=cr-8223101" in the URL). Neither link automatically loads a shopping cart with the associated CD. Further, a visitor directly accessing the CDNow Web site has no way to directly fill one's shopping cart with both of these CDs. A new kind of link to the CDNow Web site can be easily added at the affiliate site, www.barbrastreisand.com, at www.cdnow.com, that would automatically load a shopping cart on behalf of the user/customer with both of these CDs with, for example a 5% discount for the purchase of both. A hypothetical URL such as:

http://www.cdnow.com/switch/from=cr-8223101/
target=buyweb_purchase/item=bway could represent the bundle of both Broadway-related CDs. A request made to that URL through the www.barbrastreisand-.com affiliate site (indicated in the URL by "from=cr-8223101") would be understood by the merchant site, www.cdnow.com, to represent a request made through that affiliate site by a user/customer for the purchase of these two CDs.

The programming required by any merchant to provide such merchant-side ESLs is readily implemented. The merchant will provide its affiliates with a program that allows them to produce not just special links to single items as in the status quo, but links to ESLs. The ESL could specify a list of, for example, CD identifiers for the example above, and an optional discount for the bundle. When the affiliate has created an ESL (such as using the record facility of smart bookmarks), the merchant program contacts the merchant's Web site, validates the CD identifiers, stores the list and the discount in a merchant database, and returns a URL referencing the stored ESL, such as the one represented above. Once the ESL has been created, the merchant's new or extended CGI script or Web server will, upon receiving a request from a user/customer of that URL, (1) parse the URL and lookup the associated list in the database; (2) create a new cookie (or modify an existing one) for the user/customer who submitted the ESL to add the items in the ESL to the shopping cart represented by the cookie; and (3) send the cookie back to the user. The merchant's extended CGI script or Web server should then also include code to verify that bundle discounts (if any) are only given to user/customers who purchase the whole bundle. Thus, for example, if the user/customer removed the Back to Broadway CD from his shopping cart, the associated 5% discount will not be given. Otherwise, users/customers could cheat the affiliate and merchant by loading bundles into their shopping carts and then removing one or more of the items that gave rise to the bundled discount.

With reference to FIG. 3, the steps associated with the merchant-side implementation of the present invention are shown. At step 301, the user/customer clicks on an ESL link on an affiliate's Web page indicating his desire to purchase the multiple items indicated on that page and associated with that link. At step 302, the merchant-side server application (e.g., a CGI-bin script) decodes the URL indicated by the request, retrieves the list from the merchant's data repository, and loads a shopping cart on behalf of the user/customer with the items on the list. It also stores a list identifier in the shopping cart if there is a discount associated with the ESL. Such a list identifier is used to associate any special properties of the bundle of items, such as the items required to be purchased to obtain the discount. At step 303, the user/customer continues to browse the merchant's Web site, loading items into the shopping cart and/or executing other ESLs on the affiliate site. At step 304, the user/customer decides to enter the checkout phase and inputs his relevant shipping and billing information. At step 305, the server verifies for each item that appears in any ESL and whose identifier is also in the shopping cart, that the sum of such items specified in the ESLs in the cart is less than or equal to the number of such items in the cart. This insures that each bundle independently contains the proper items that are necessary for the bundle discount. At step 306, a determination is made whether the verification has succeeded. If yes, at step 307, the checkout is complete. If not, then, at step 308, the user/customer is told they are ineligible for one or more discounts and asked whether they still wish to checkout. If they respond affirmatively, at step 309, then checkout is complete at step 307. If they answer negatively, at step 309, then, at step 310, the user/customer is sent to another page on the merchant's site, enabling the user/customer to continue browsing the site, commencing again at step 303.

ESLs can also be applied, in accordance with the present invention, to permission marketing. In accordance with permission marketing, offers are sent on-line to individual customers or groups of customers who have given permission to be the recipient of such offers. Bundles of offers, for example, clothing suggestions (possibly with an ability to see them tried on), party supplies, gift basket items, etc., can be produced by a merchant employing permission marketing and sent as email or placed on a personal Web page for individual customers. The customer receiving such an offer can easily order a bundle of items in the manner described above by clicking on a link in the email message or on the personal Web page. Advantageously, the ESL can be customized with a particular customer in mind based on, for example, that customer's previous buying habits, rather than as a more general offering. Alternatively, the offer can be customized to a particular group of potential customers who meet certain demographic criteria. Thus, for example, a merchant can focus a particular merchandising offer containing multiple items to only those members of a group whose demographic criteria would indicate particular interest in such an offer. An email containing an ESL link for those multiple items will be sent by a merchant to only those individuals who have agreed to accept such marketing and whom the merchant believes would be interested in the bundled offer. Given the simplicity of producing ESLs, as described above, creative bundling options are significantly easier to develop than the alternatives which require server-side programming. As described, creating ESLs requires no programming, only an intuitive tape-recorder style interface. Many more experiments to determine the most effective kinds of promotions can be readily performed. In permission marketing, experimentation has found that response rates can be dramatically increased through the use of an effectively configured promotion. As in the affiliate program previously described, the multiple items represented by the ESL are not offered or available for purchase as a bundle by a user who directly visits the merchant Web site.

Figure 4:
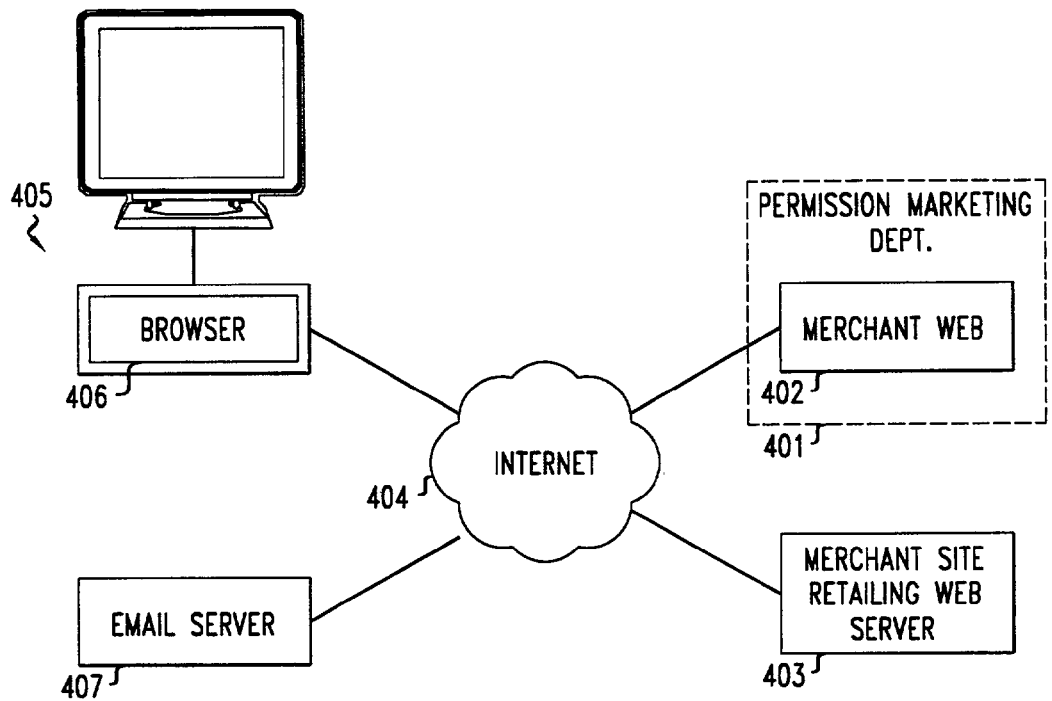
FIG. 4 is a block diagram showing the use of ESLs in conjunction with permission marketing in accordance with the present invention.

FIG. 4 is a block diagram showing the permission marketing use of executable shopping lists in accordance with the present invention. In this embodiment, the permission marketing department 401 associated with a merchant Web site 402, which may or may not be co-located with the merchant site retailing Web server 403, or even the same server, sends an email message presenting a bundled offer containing ESLs over the Internet 404 to the email address of a user at client 405 running browser 406. The user/consumer, upon retrieving that email message from his email server 407 and reading the one or more offers, selects a link associated with an offer. Upon selecting that link, a request is made to the merchant site retailing Web server 403, which loads a shopping cart on behalf of the user with the multiple items specified by the ESL, and then sends a Web page containing a shopping cart loaded with those items back to the user's browser 406.

As previously noted, rather than sending the customer an email with a link to the bundled offer, the bundled offer can alternatively be placed on a personal Web page for individual customers, which has a link to the bundled offer. The email can also be sent to user's two-way pager, from which the offer can be accepted by the user by replying to the email message. An offer can be presented to a customer's cell phone using a Wireless Access Protocol (WAP) or any other wireless protocol, or to a PDA with a wireless modem through which Web access is effected. Also, the offer can be presented to a customer through his telephone set via an electronic document formatted in Voice Extensible Markup Language (Voice XML), or any similar language such as VoxML. Such an electronic document would be sent to a telephone/IP server where it is converted to an audio signal with an associated link and sent to a user's telephone. The user, upon listening to the message could affirmatively select the offered link, and thus the offer, via voice or touch-tone input. That acceptance, recognized by the telephone/IP server, is sent to the merchant's server, which in turn fills a shopping cart on behalf of the user with the multiple items in the offer.

Although the present invention has been described in conjunction with a wired terminal on which email messages or Web pages containing ESLs are retrieved, the present invention in any of its embodiments can be used for linking from any type of terminal, wired or wireless, to a merchant Web page on which on-line purchases of multiple individual goods and/or services of any kind can be made. Further, although described above in conjunction with the familiar shopping cart ordering model in which items are selected by clicking on the item or an icon, which item is then added to a user's/customer's virtual shopping cart, the present invention can equally be applied to any other methodology which the user/customer is able to individually select on-line by any manner those items he wishes to purchase. This includes so called "one-click" methodologies in which a purchase is completed when a user known to a merchant site through a cookie or any other mechanism selects that item, as is described in U.S. Pat. No. 5,960,411 to Hartman et al, issued Sep. 28, 1999.

The foregoing merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language that were recited herein were principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views embodying the principles of the invention. Similarly, it will be appreciated that the flowcharts, and the like represent various processes which may be substantially represented in computer readable medium and so executed by a computer or processor, whether or not such computer or processor is explicitly shown.

The functions of the various elements shown in the FIGS., may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

The invention claimed is:

1. A method comprising:
receiving at a Web site of a merchant a request initiated by a user from a client through a single action initiated in a browser that is browsing at a Web page of a Web site of an affiliate of said merchant, the request being initiated to order a bundle of multiple items that are offered for sale as a bundle to visitors of the affiliate's Web site and not offered for sale as a bundle to direct on-line visitors to the merchant's Web site, the bundle of multiple items having been created by or on behalf of the affiliate only for sale to visitors of the Web site of the affiliate, and said bundle of items stored in an executable shopping list;
automatically loading the bundle of items in the executable shopping list into a shopping cart at the merchant's Web site in response to said single action; and
automatically creating at the merchant's Web site an order for a purchase by the user of the bundle of multiple items.

2. A method comprising:
automatically creating at a Web site of a merchant an order comprising a bundle of multiple items in response to a request initiated by a user from a client through a single action made at a Web site of an affiliate of the merchant to initiate a purchase of the bundle of multiple items, the bundle of multiple items not being offered for sale as a bundle to direct on-line visitors to that merchant's Web site, the bundle of multiple items having been created by or on behalf of the affiliate only for sale to visitors to the Web site of the affiliate, and said bundle of items stored in an executable shopping list; and
automatically loading the bundle of items in the executable shopping list into a shopping cart at the merchant's Web site in response to said single action.

3. The method of claim 1 or 2 wherein the client is a computer terminal.

4. The method of claim 1 or 2 wherein the client is a cell phone interacting with the Internet under a wireless protocol.

5. The method of claim 1 or 2 wherein the client is a personal digital assistant (PDA) having a wireless modem for connection to the Internet.

6. The method of claim 1 or 2 wherein the client is a telephone that receives voice messages from a telephone/IP server that are converted from Web pages formatted in a voice-recognizable markup language, and which telephone/IP server converts the request initiated by the user at the telephone into a request that is recognized by the merchant's Web site.

7. The method of claim 1 or 2 further comprising:
forwarding an indication of each of the ordered multiple items in the bundle to the client.

8. The method of claim 7 wherein the order is created for the user using a shopping cart ordering model and the indication forwarded to the client is a Web page comprising a virtual shopping cart filled with the bundle of multiple items.

9. The method of claim 8 wherein the request initiates a pre-recorded smart bookmark to automatically play a sequence of steps causing the merchant's Web site to load the virtual shopping cart with each of the multiple items in the bundle on behalf of the user.

10. The method of claim 9 wherein the smart bookmark also loads a discount associated with the purchase of the multiple items into the virtual shopping cart.

11. The method of claim 8 wherein the request initiates a program running on the merchant's Web site that recognizes the request and automatically causes the merchant's Web site to load the virtual shopping cart on behalf of the user with each of the multiple items in the bundle.

12. The method of claim 11 wherein the program is a CGI-bin script.

13. The method of claim 11 wherein the request is represented as a URL.

14. The method of claim 13 wherein a bundle discount is associated with the purchase of the bundle of the multiple items and the discount is loaded in the virtual shopping cart in association with the bundle of multiple items.

15. The method of claim 14 further comprising, before completing a checkout, determining for each bundle of multiple items in the user's virtual shopping cart that it separately includes each of the multiple items required for eligibility of the bundle discount associated with that bundle, and applying the discount associated with a bundle only if that bundle properly includes each of said multiple items.

* * * * *